US012808517B2

(12) United States Patent
Pagliarini

(10) Patent No.: US 12,808,517 B2
(45) Date of Patent: Nov. 24, 2026

(54) LIGHTING DEVICE

(71) Applicant: YUYAO HILITE ELECTRIC CO., LTD, Yuyao Zhejiang (CN)

(72) Inventor: Franco Pagliarini, Cortefranca (IT)

(73) Assignee: YUYAO HILITE ELECTRIC CO., LTD, Yuyao Zhejiang (CN)

( * ) Notice: Subject to any disclaimer, the term of this patent is extended or adjusted under 35 U.S.C. 154(b) by 0 days.

(21) Appl. No.: 19/231,110

(22) Filed: Jun. 6, 2025

(65) Prior Publication Data

US 2025/0377090 A1 Dec. 11, 2025

(30) Foreign Application Priority Data

Jun. 7, 2024 (CN) ......................... 202410743261.6

(51) Int. Cl.

| | |
|---|---|
| ***F21V 17/10*** | (2006.01) |
| ***F21S 9/02*** | (2006.01) |
| ***F21V 23/00*** | (2015.01) |
| ***F21V 23/02*** | (2006.01) |
| ***F21V 23/04*** | (2006.01) |
| ***H05B 45/10*** | (2020.01) |
| ***H05B 45/20*** | (2020.01) |
| ***H05B 47/19*** | (2020.01) |
| *F21Y 115/10* | (2016.01) |

(52) U.S. Cl.

CPC .............. *F21V 17/105* (2013.01); *F21S 9/02* (2013.01); *F21V 23/001* (2013.01); *F21V 23/02* (2013.01); *F21V 23/0435* (2013.01); *H05B 45/10* (2020.01); *H05B 45/20* (2020.01); *H05B 47/19* (2020.01); *F21Y 2115/10* (2016.08)

(58) Field of Classification Search

CPC .... F21V 23/001; F21V 23/02; F21V 23/0435; F21V 17/105; F21S 9/02; H05B 45/10; H05B 47/19; H05B 45/20

See application file for complete search history.

(56) References Cited

U.S. PATENT DOCUMENTS

| | | | | |
|---|---|---|---|---|
| 12,000,545 B1 * | 6/2024 | Cao | | F21K 9/237 |
| 12,313,245 B1 * | 5/2025 | Jiang | | F21V 21/02 |
| 12,352,395 B1 * | 7/2025 | Cao | | F21V 23/06 |
| 12,385,609 B1 * | 8/2025 | Qiu | | F21K 9/232 |
| 2009/0207611 A1 * | 8/2009 | Gardi | | F21S 6/005 362/249.02 |
| 2023/0383915 A1 * | 11/2023 | Jeong | | F21S 9/037 |
| 2025/0306260 A1 * | 10/2025 | Lin | | F21V 17/002 |

FOREIGN PATENT DOCUMENTS

| | | | |
|---|---|---|---|
| EP | 1686312 A1 * | 8/2006 | F21S 6/005 |

* cited by examiner

*Primary Examiner* — Christopher E Dunay
(74) *Attorney, Agent, or Firm* — NIXON & VANDERHYE

(57) ABSTRACT

The present invention relates to a lighting device. More specifically, it is an autonomous and, therefore, rechargeable lighting device, which can be used in a flexible and practical manner depending on the intended use.

8 Claims, 2 Drawing Sheets

LIGHTING DEVICE

This application claims priority to CN patent application No. 202410743261.6, filed Jun. 7, 2024, the entire contents of which are hereby incorporated by reference.

The present invention relates to a lighting device. More specifically, it is an autonomous and, therefore, rechargeable lighting device, which can be used in a flexible and practical manner depending on the intended use.

As is well known, in the field of lighting technology, in order to avoid the constraint of a power cable and to have maximum freedom of positioning, rechargeable lamps are becoming increasingly popular.

Such rechargeable lamps are increasingly large in size, so that they are also aesthetically autonomous and furnish the space in which they are placed independently.

However, such rechargeable lamps have to be moved close to the charger every time they are discharged, which is inconvenient for the user.

Indeed, no one would willingly move a lamp of a certain size and weight to place it in another area of the house where the charger is located, connected to a socket.

Furthermore, if the lamp has been placed in a certain position for reasons of decoration, i.e. for aesthetic reasons, in order to recharge it, it is necessary to move the entire lamp, thus depriving that particular area of the embellishment provided by the lamp itself for the entire recharging time.

It is an object of the present invention to provide a lighting device which overcomes the problems of the known technique.

A further scope of the invention is to provide a lighting device which avoids the displacement of aesthetically pleasing lamps or illuminating objects.

A further purpose of the invention is to provide a lighting device that is easily moved, without depriving the aesthetic gradient provided by a lamp or other lighting object.

These and other purposes are achieved by a lighting device according to the appended claims.

Figure 1:
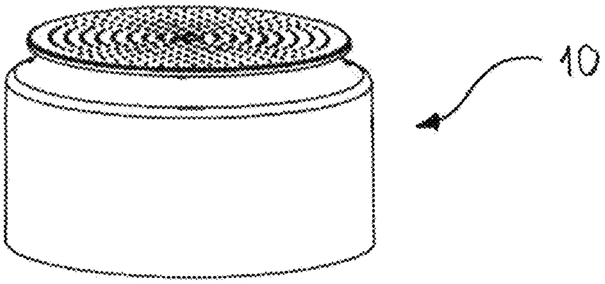
Figure 2:
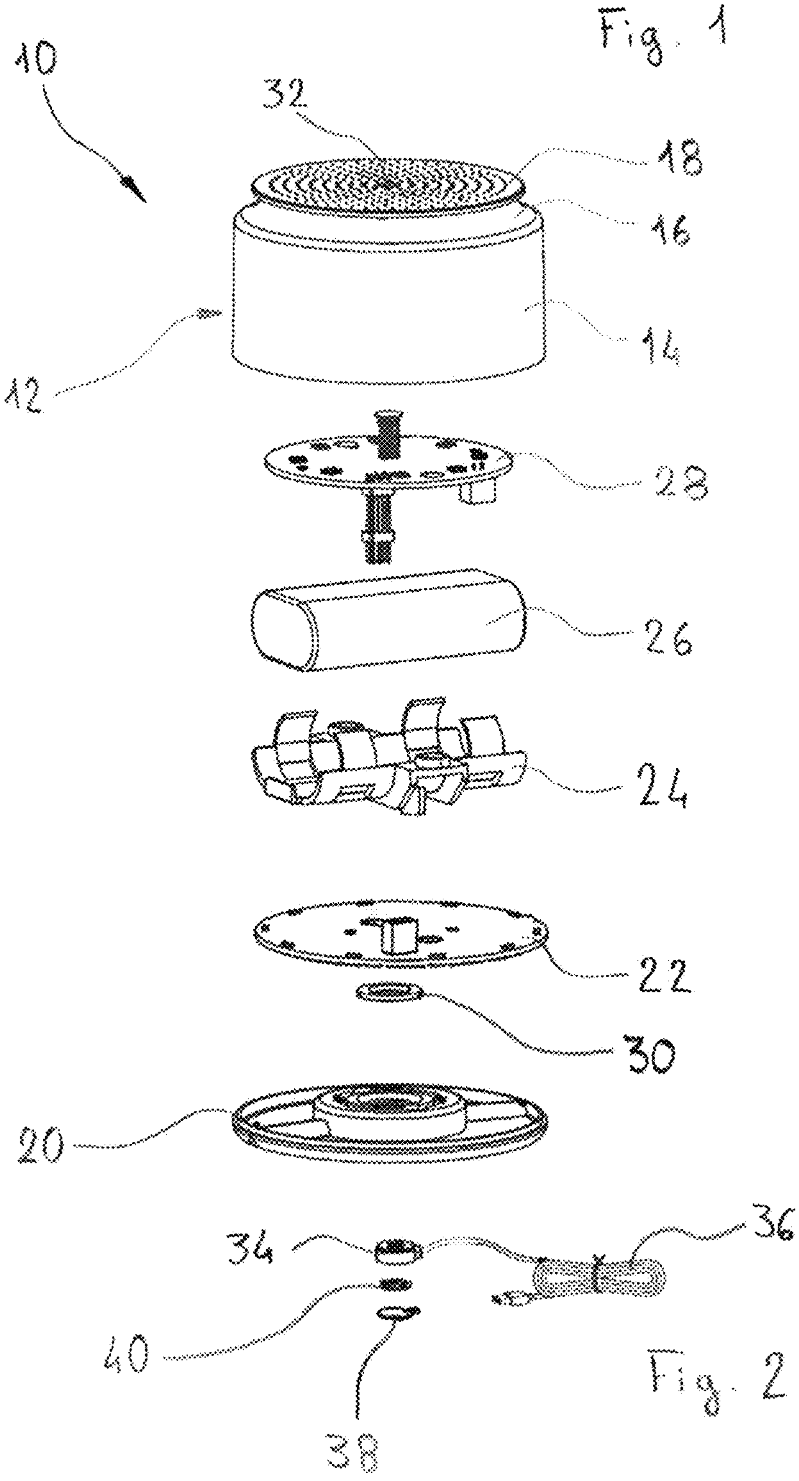
Figure 3:
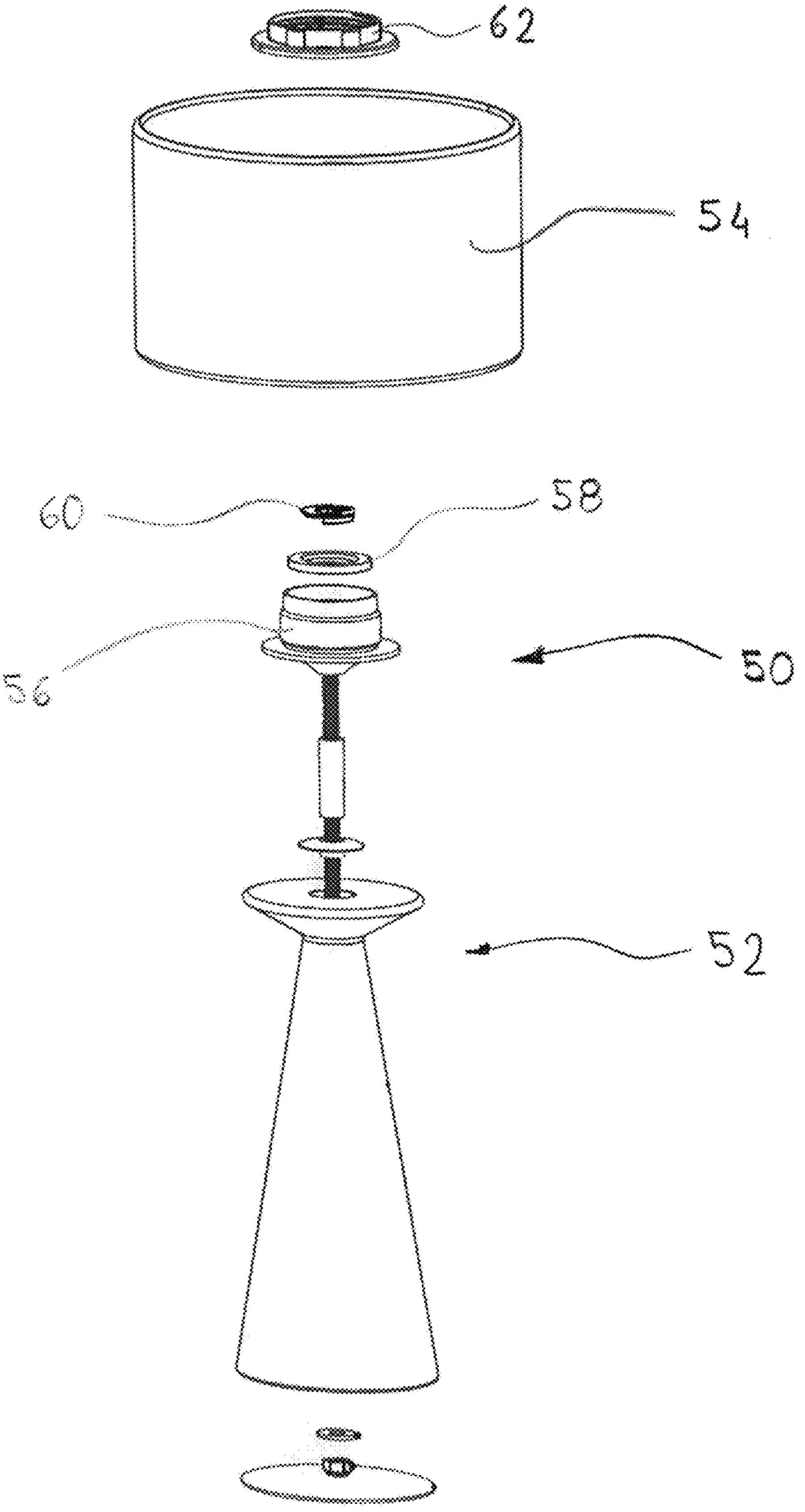

Further features and details may be better understood from the following description, given as a non-limiting example, as well as from the enclosed drawing tables, in which FIG. 1 is an axonometric view of a lighting device according to the invention;

FIG. 2 is an exploded axonometric view of the lighting device according to the invention; and FIG. 3 is an exploded axonometric view of a lampshade in which the lighting device of FIG. 1 may be positioned.

With reference to the appended figures, a lighting device according to the invention is identified with 10.

The lighting device 10 comprises an outer casing 12 comprising a substantially cylindrical lower portion 14 terminating in a truncated upper portion 16 which is closed at the top by a perforated disc 18.

The lower portion 14 and the upper portion 16 are made of semi-transparent polycarbonate (opal polycarbonate) in order to ensure homogeneous light emission.

The housing 12 is closed at the bottom by a base 20.

Above the base 20, within the housing 12, are arranged, as illustrated in FIG. 2, from bottom to top

- a lower printed circuit board 22 on which LEDs are arranged;
- a battery holder 24;
- a battery pack 26;
- an upper printed circuit board 28 on which further LEDs are arranged A first magnet 30 is arranged between the lower printed circuit board 22 and the base 20.

In order to avoid glare, the previously named LEDs are arranged as follows:

- a first level of downward-facing LEDs with maximum light emission;
- a second tier of side-facing LEDs with medium light intensity, further mediated by the semi-transparent housing;
- a third level of upward-facing LEDs with medium-low light intensity.

The perforated disc 18 is partially obscured by a serigraphy of small open circles of varying diameters in order to reduce upper glare.

Centrally arranged on the perforated disc 18 is a contact switch 32 on which the corresponding ignition symbol is drawn.

The contact switch 32 controls the switching on and off of the LEDs, as well as allowing their intensity to be varied and the switching to the two available light colours.

The battery pack 26 is mounted in the battery holder 24 from which it is easily removable, so that the same battery pack 26 can be replaced by the lighting device 10, in case the same battery pack 26 has run out.

The lighting device 10 further comprises a charging base 34 with a cable 36 for connection to the mains.

The charging base 34 is closed by a cap 38 so as to keep a second magnet 40 fixed to the charging base.

The first magnet 30 and the second magnet 40 allow the charging base 34 to be held together with the base 20 and allow the battery pack 26 to be charged.

On the underside of the base 20, two parallel grooves are cut to receive two homologous reliefs included on the charging base 34. In this way, regular positioning between the base 20 and the charging base 34 is further ensured.

Furthermore, the first magnet 30 also enables the joining of the lighting device 10 according to the invention to a lampshade 50, such as the one illustrated in FIG. 3.

In fact, the lampshade 50 comprises a support 52 to which a light shielding element 54 is fixed secured by a ring nut 62.

Attached to the support 52 is a support 56 in which is arranged a third magnet 58 locked by a ring 60.

The support 56 is suitable for receiving the lighting device 10 which is constrained in position by the action of the first magnet 30 and the third magnet 58.

During the charging phase, the bulb emits a faint red status light which turns green when charging is completed.

In addition, the perforated disc 18 protrudes slightly so as to provide a convenient grip for removing the lighting device 10 from the lampshade 50.

The lighting device 10 according to the invention has a function for changing the light output, as well as including a function for changing from very warm light (2700 K) to warm light (3000 K).

The lighting device 10 according to the invention thus makes it possible to always keep the respective lampshade or other lighting fixture in the same position and only move the same lighting device 10 for recharging it.

In addition to classic lampshades, the lighting device 10 can also be placed in other lighting furniture elements, such as wall elements, compatible with the lighting device 10 and placed at heights that allow the same lighting device 10 to be pulled out and reinserted.

By having two lighting devices 10, the continuous use of lampshades or other elements can be ensured. While a first lighting device is placed in the respective lampshade, the second lighting device can be recharged.

Variants and embodiments other than those illustrated above are possible and are to be considered within the scope of protection defined by the appended claims.

For example, it is also possible to have controls operating remotely via a radio-wave remote control.

In fact, the lighting device may further comprise a wireless control module configured to enable remote control of individual light units or groups of light sources (i.e. the LEDs), supporting features such as group pairing, scene control, and wireless communication via protocols including, but not limited to, RF, Bluetooth, or Wi-Fi, thereby facilitating flexible and centralized light management.

Said wireless control module is adapted to:

allow pairing of the lighting device with one or more additional lighting devices to form a controllable group;

enable selection of preconfigured or user-defined lighting scenes; and communicate via a wireless protocol selected from radio frequency (RF), Bluetooth, or Wi-Fi.

Furthermore, it is possible to use RGB light sources, with the possibility of coloured emission at the user's choice.

The invention claimed is:

1. A lighting device configured to be coupled to a lampshade or other element including a coupling magnet, said lighting device comprising:

an outer casing;

a base configured to enclose the outer casing at a bottom thereof, a first magnet being attached to the base to join with the coupling magnet to ensure coupling between the lighting device and the lampshade or other element; and at least one printed circuit board disposed between the outer casing and the base, the at least one printed circuit board comprising light emitting diodes (LEDS), wherein the outer casing comprises a lower portion substantially cylindrical ending with an upper portion truncated cone-shaped, superiorly closed by a perforated disc.

2. The lighting device according to claim 1, wherein the first layer of LEDs facing downwards has maximum luminous intensity.

3. The lighting device according to claim 2, further comprising a contact switch centrally disposed on the perforated disc.

4. The lighting device according to claim 1, wherein the second layer of side-facing LEDs has medium luminous intensity.

5. The lighting device according to claim 1, wherein the perforated disc is partially obscured by a serigraphy to reduce an upper glare.

6. The lighting device according to claim 1, further comprising a charging base having a cable configured to connect to an electrical power supply.

7. The lighting device according to claim 6, wherein the charging base is closed by a cap to keep a second magnet fixed to the charging base.

8. The lighting device according to claim 1, further comprising a wireless controller configured to enable remote operation of the lighting device, said wireless control module being configured to:

allow pairing of the lighting device with one or more additional lighting devices to form a controllable group, enable selection of preconfigured or user-defined lighting scenes, and communicate via a wireless protocol selected from radio frequency (RF), Bluetooth, or Wi-Fi.

* * * * *